United States Patent [19] [11] 3,883,532
Begland [45] May 13, 1975

[54] 2-SUBSTITUTED -4,5-DIAMINO-6-CYANOPYRIMIDINES
[75] Inventor: Robert W. Begland, Wilmington, Del.
[73] Assignee: E. I. du Pont de Nemours & Company, Wilmington, Del.
[22] Filed: Mar. 14, 1973
[21] Appl. No.: 341,249

[52] U.S. Cl.... 260/256.4 C; 260/2 N; 260/256.4 N; 260/465 E; 260/465.5 R
[51] Int. Cl............................................. C07d 51/42
[58] Field of Search............... 260/256.4 C, 256.4 N

[56] References Cited
UNITED STATES PATENTS
2,139,870   12/1938   Wilmanns et al. ............... 260/256.4

Primary Examiner—James A. Patten

[57] ABSTRACT

Certain novel, 4,5-diamino-6-cyanopyrimidines, e.g., 2,6-dicyano-4,5-diaminopyrimidine and 2-alkoxy-4,5-diamino-6-cyanopyrimidine, useful as epoxy curing agents, are prepared by the cyclization of certain 1-amino-2-(substituted)maleonitriles, prepared in turn from the reaction of diaminomaleonitrile and selected substituted cyanoformimidates.

4 Claims, No Drawings

2-SUBSTITUTED -4,5-DIAMINO-6-CYANOPYRIDINES

BACKGROUND OF THE INVENTION

1. Field of the Invention

This invention is concerned with, and has as its principal objects provision of, a process for the reaction of diaminomaleonitrile with cyanoformimidates and the successive novel substituted maleonitriles and isomeric pyrimidines that can be obtained therefrom.

2. Prior Art

No direct references to the compounds or processes of this invention have been found. The closest art appears to be:

a. J. Clark, et al., J. Chem. Soc. 3221–5 (1964); 2-ethoxy-4,5-diamino-6-ethoxycarbonylpyrimidine.
b. S. Trofimenko, et al., J. Org. Chem. 27, 433–8 (1962); 2-methyl-4,6-diamino-5-cyanopyrimidine.
c. Huber, J. Am. Chem. Soc., 65, 2226–6,(1943); 2,-4-diamino-5-cyanopyrimidine.
d. Hromatka, U.S. Pat. No. 2,235,638 (to Merck and Co., 1941);

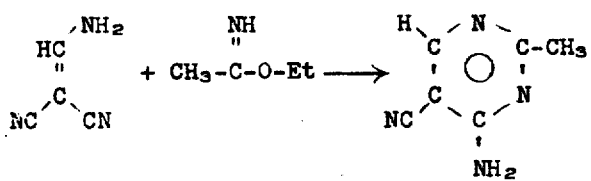

STATEMENT OF THE INVENTION

There has now been discovered a process for reacting diaminomaleonitrile with an alkyl, alkoxyalkyl, arylalkyl, haloalkyl, or nitroalkyl cyanoformimidate, in a first step, to yield, respectively, a 1-amino-2-(aminoalkoxymethyleneamino)-maleonitrile or 1-amino-2-(aminocyanomethyleneamino)maleonitrile. These latter compounds are cyclized, respectively, in a second step, to the corresponding 2-alkoxy-4,5-diamino-6-cyanopyrimidines or 4,5-diamino-2,6-dicyanopyrimidine.

The reactions may be represented by the equations:

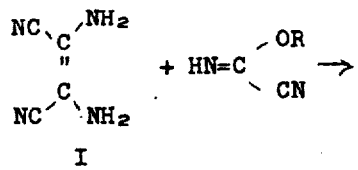

I

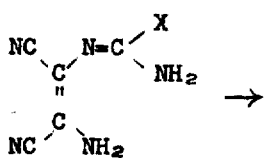

II

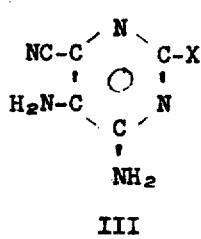

III

R being a group of the formula $$R^1-\overset{|}{C}H-R^2$$

in which $R^1$ and $R^2$, alike or different, may be H, alkyl, alkoxy, alkenyl, alkynyl or alkoxyalkyl, all of up to 7 carbon atoms, or phenyl or any of their substituted derivatives having from 1–14 (1–5 for phenyl) halogen (particularly fluoro or chloro) or nitro substituents and X is $OR^3$ or CN.

When R has at least one β-carbon atom and said β-carbon carries at least two fluoro, chloro or nitro substituents, OR is a more active leaving group than cyano in the first reaction above and X in products II and III is CN.

When no β-carbon in R carries more than one fluoro, chloro or nitro substituent, OR is a less active leaving group than cyano in the first reaction above and X in products II and III is $OR^3$, $R^3$ being defined the same as R above with the proviso that any α-carbon atom in $R^1$ or $R^2$ carries no more than one fluoro, chloro or nitro substituent.

The 1-amino-2-(substituted aminomethyleneamino)-maleonitriles of Formula II are crystalline solids which are useful for cyclizing into products of Formula III. The 2-substituted-4,5-diamino-6-cyanopyrimidines of Formula III are crystalline solids which are all useful as curing agents for epoxy resins, as illustrated in Example A below.

Reaction of Diaminomaleonitrile with a Cyanoformimidate (Step 1)

The reaction of diaminomaleonitrile with a cyanoformimidate, as shown above, may be carried out neat since cyanoformimidates are liquids or can be reduced to liquids at mildly elevated temperatures. However, to provide for better control of the reaction and dissipation of the heat of reaction, it is preferred to employ an organic solvent which is inert to the reactants and products. Suitable solvents include ethers, such as tetrahydrofuran and dioxane; nitriles, such as acetonitrile and benzonitrile; chlorocarbons, such as methylene chloride, chloroform, carbon tetrachloride and tetrachloroethane; aromatic hydrocarbons, such as benzene and toluene, dimethyl formamide, dimethyl acetamide, dimethyl sulfoxide, and the like. Alcohols, ketones and water tend to react with the starting materials and are to be avoided.

The reaction is catalyzed by the presence of acid. Any acid may be employed but a catalytic amount of a strong acid is preferred. Suitable acids include sulfuric acid, hydrochloric acid, trifluoroacetic acid, p-toluenesulfonic acid, oxalic acid, and the like.

Temperature and pressure are not critical parameters in the reaction. Temperatures from 0° to 200°C and above are operable and temperatures in the range from 20° to about 125°C are preferred. Pressures above and below atmospheric pressure are operable and atmospheric pressure is preferred for convenience.

The molecular proportions in which diaminomaleonitrile and the cyanoformimidate may be brought together to carry out this reaction may be varied widely, e.g., from 1:20 to 20:1, respectively. Proportions in the range from 2:1 to 1:2 are preferred and 1:1 proportions may be used to advantage.

Cyclization Reaction (Step 2)

The cyclization (isomerization) of the 1-amino-2-(substituted aminomethyleneamino)maleonitriles of Formula II to the 2-substituted-4,5-diamino-6-cyanopyrimidines of Formula III is catalyzed by a small amount of a strong base. Operable bases include trialkylamines, such as trimethyl amine and triethylamine; alkali metal alkoxides, such as sodium methoxide and sodium ethoxide; alkali metal hydroxides, such as sodium hydroxide and potassium hydroxide, and the like.

This base-catalyzed reaction may be carried out neat, e.g., by melting the starting material in the presence of the catalyst. However, it is preferred to employ an organic solvent which is inert to the starting material and product. Suitable solvents include ethers, such as tetrahydrofuran and dioxane; nitriles, such as acetonitrile and benzonitrile; chlorocarbons, such as methylene chloride, chloroform, carbon tetrachloride, and tetrachloroethane; aromatic hydrocarbons, such as benzene and toluene, dimethyl formamide, dimethyl acetamide, dimethyl sulfoxide, and the like.

With compounds of Formula II in which X is $OR^3$, the cyclization reaction may also be catalyzed by small amounts of strong acids in water, e.g., a catalytic amount of sulfuric acid, hydrochloric acid, trifluoroacetic acid, p-toluenesulfonic acid, oxalic acid, and the like, may be employed using water as the reaction medium.

Temperature and pressure are not critical parameters in the cyclization reaction. Temperatures from 0° to 200°C and above are operable and temperatures from 20° to about 125°C are preferred. Pressures above and below atmospheric pressure are operable and atmospheric pressure is preferred for convenience.

Products of Formulas II and III are isolated from the reaction mixtures in which they are formed by known means.

EMBODIMENTS OF THE INVENTION

There follow some nonlimiting examples illustrating aspects of the invention. Examples 1–8 and the Table disclose novel compounds of the invention. Example A is a utility example showing the use of the pyrimidines of the invention as epoxy curing agents. In these examples, parts are by weight unless otherwise specified.

EXAMPLE 1

1-Amino-2-(aminomethoxymethyleneamino)maleonitrile

Part A

A solution of 0.2 g of potassium cyanide in 16.0 g (0.50 mole) of methanol was cooled to 5°C and about 26 g (0.5 mole) of cyanogen was bubbled into it over 0.5 hour. The resulting solution was warmed to room temperature and distilled to give 17.2 g (41%) of methyl cyanoformimidate, bp 70°–80°C at 160 mm.

Part B

To a solution of 4.20 g (0.05 mole) of methyl cyanoformimidate and 5.40 g (0.05 mole) of diaminomaleonitrile in 100 ml of acetonitrile was added 5 drops of concentrated sulfuric acid. The resulting solution was stirred for 20 hours, filtered and stripped to give a yellow solid. Recrystallization from ether gave 4.98 g (60.6%) of 1-amino-2-(aminomethoxymethyleneamino)maleonitrile as light yellow crystals, mp 114°–116°C; IR (KBr) 2.89, 2.95, 2.99, 4.57, 6.02, 6.22 and 6.27 $\mu$; UV (CH$_3$CN) 304 nm ($\epsilon$ = 15,000); NMR (acetone-d$_6$) 3.60 $\delta$ (s, 3), 5.20 $\delta$ (b, 2), 5.75 $\delta$ (b, 2).

Anal. Calcd for C$_6$H$_7$ON$_5$: C, 43.63; H, 4.20; N, 42.41
Found: C, 43.72; H, 4.20; N, 42.68.

EXAMPLE 2

1-Amino-2-(aminomethoxymethyleneamino)maleonitrile

To a solution of 4.9 g (0.05 mole) of ethyl cyanoformimidate (L. Weinstock, et al., J. Org. Chem. 32, 2823–29, 1967) and 5.4 g (0.05 mole) of diaminomaleonitrile in 100 ml of acetonitrile was added 5 drops of concentrated sulfuric acid. After being stirred for 2 days, the solution was filtered, the solvent was removed by evaporation and the crude product was recrystallized from ether-petroleum ether to give 5.0 g (56%) of colorless crystals of 1-amino-2-(aminomethoxymethyleneamino)maleonitrile, mp 108°–110°C; IR (KBr) 2.88, 2.98, 4.48, 4.55, 6.05 and 6.25 $\mu$; UV (CH$_3$CN) 305 nm ($\epsilon$ = 15,500); NMR (DMSO-d$_6$) 1.20 $\delta$ (t, J = 7, 3), 4.18 $\delta$ (q, J = 7, 2), 5.8 $\delta$ (b, 2), 6.5 $\delta$ (b, 2).

Anal. Calcd. for C$_7$H$_9$ON$_5$: C, 46.92; H, 5.06; N, 39.09
Found: C, 47.00; H, 5.02; N, 39.09.

EXAMPLE 3

1-Amino-2-(aminocyanomethyleneamino)maleonitrile

Part A 2,2,3,3,4,4,5,5-Octafluoropentyl cyanoformimidate was prepared from 1.0 mole of cyanogen and 1.0 mole of octafluoropentanol by the procedure of Example 1, Part A. There was obtained an 81% yield of the desired cyanoformimidate, bp 58°–60°C at 0.50 mm. NMR (CDCl$_3$) 4.78 $\delta$ (t, 2), 6.10 $\delta$ (t, 1), 9.50 $\delta$ (s, 1).

Anal. Calcd for C$_7$H$_4$ON$_2$F$_8$: C, 29.59 H, 1.39; N, 9.85
Found: C, 29.75; H, 1.69; N, 10.03.

Part B

To a solution of 34 g (0.12 mole of 2,2,3,3,4,4,5,5-octafluoropentyl cyanoformimidate and 10.8 g (0.10 mole) of diaminomaleonitrile in 200 ml of acetonitrile was added 10 drops of concentrated H$_2$SO$_4$. The resulting solution was refluxed for 3 hours, treated with activated carbon and filtered, and the solvent was removed to give 15.5 g (97%) of 1-amino-2-(aminocyanomethyleneamino)maleonitrile as a yellow powder. An analytically pure sample was obtained by recrystallization from chloroform-ethyl acetate as yellow crystals, mp 149°–152°C (dec.); IR (KBr) 2.92, 3.02, 3.12, 4.46, 4.56, 6.09, 6.21 and 6.41 $\mu$; UV (CH$_3$CN) 232 nm ($\epsilon$ = 5500), 288 nm ($\epsilon$ = 5800), 348 nm ($\epsilon$ = 13,200); NMR (DMSO-d$_6$) 6.75 $\delta$ (b, 2), 8.0 $\delta$ (b, 2).

Anal. Calcd for C$_6$H$_4$N$_6$: C, 45.00; H, 2.52; N, 52.48
Found: C, 45.19; H, 2.56; N, 52.52.

EXAMPLE 4

1-Amino-2-(aminocyanomethyleneamino)maleonitrile

Part A 2,2,2-Trifluoroethyl cyanoformimidate was prepared in 95% yield from trifluoroethanol and cyanogen as a colorless liquid, bp 53°C at 20 mm. IR (neat) 3.10, 3.20, 4.55, 5.95 and 6.0 $\mu$.

Part B

A solution of 16.7 g (0.11 mole) of 2,2,2-trifluoroethyl cyanoformimidate, 10.8 g (0.10 mole) of diaminomaleonitrile, 10 drops of concentrated sulfuric acid and 200 ml of tetrahydrofuran was stirred for 2 days at 25°C. The resulting solution was filtered and the solvent was removed to give 15.7 g (98%) of 1-amino-2-(aminocyanomethyleneamino)maleonitrile.

EXAMPLE 5

1-Amino-2-(aminocyanomethyleneamino)maleonitrile

Part A

A solution of 74.7 g (0.5 mole) of trichloroethanol and 0.5 g of powdered potassium hydroxide in 50 ml of tetrahydrofuran was cooled to −20°C and 26 g (0.5 mole) of cyanogen was bubbled in over 15 minutes. The resulting solution was warmed to room temperature, the solvent was evaporated and 50 ml of ether was added to the resulting mixture of solid and oil. Filtration of this solution gave 11.2 g of colorless crystals. Evaporation of the ether gave 46 g (44%) of 2,2,2-trichloroethyl cyanoformimidate as a light yellow oil. IR (nujol) 3.00, 4.45 and 5.95 $\mu$; NMR (CDCl$_3$) 5.0 $\delta$ (s, 2), 9.75 $\delta$ (b, 1).

Part B

To a solution of 10.1 g (0.05 mole) of 2,2,2-trichloroethyl cyanoformimidate and 5.40 g (0.05 mole) of diaminomaleonitrile in 100 ml of tetrahydrofuran was added 5 drops of concentrated H$_2$SO$_4$. The resulting solution was refluxed for 2 hours, treated with activated carbon and filtered, and the solvent was evaporated to give a sticky solid. This material was slurried with ether-petroleum ether and collected to give 7.3 g (91%) of 1-amino-2-(aminocyanomethyleneamino)maleonitrile identical by IR to a previously prepared sample.

EXAMPLE 6

2,6-Dicyano-4,5-diaminopyrimidine

A solution of 3.52 g of 1-amino-2-(aminocyanomethyleneamino)maleonitrile and 10 drops of triethylamine in 50 ml of acetonitrile was stirred at room temperature for 20 hours during which time a yellow precipitate formed. Tetrahydrofuran (250 ml) was added and the resulting mixture heated to reflux and filtered to give 1.35 g (38%) of 2,6-dicyano-4,5diaminopyrimidine as a yellow powder, mp (slowly darkens above 200°C). The same product from a similar preparation gave the following analyses: IR (KBr) 2.91, 3.03, 3.19, 4.45, 6.07, 6.25 and 6.50 $\mu$; UV (EtOH) 288 nm ($\epsilon$ = 7200), 325 nm ($\epsilon$ = 9700), 413 nm ($\epsilon$ = 4900). Evaporation of the tetrahydrofuran gave 1.0 g of 2,3-diamino-5,6-dicyanopyrazine.

EXAMPLE 7

2-Methoxy-4,5-diamino-6-cyanopyrimidine

Part A - Acid Catalyzed

A slurry of 2.0 g of 1-amino-2-(aminomethoxymethyleneamino)maleonitrile in 50 ml of water containing 1 drop of sulfuric acid was heated to reflux over 10 minutes. During this time the solid dissolved, the solution darkened in color and gold-brown needles began to form. The resulting mixture was cooled and filtered to give 1.66 g (83%) of 2-methoxy-4,5-diamino-6-cyanopyrimidine. Recrystallization from methanol or water gave dark gold needles, mp (slowly darkens above 180°C). IR (KBr) 2.88, 2.94, 3.02, 3.05, 3.25, 4.50, 6.12, 6.20 and 6.52 $\mu$; UV (CH$_3$CN) 225 nm ($\epsilon$ = 7800), 306 nm ($\epsilon$ = 11,500), 378 nm ($\epsilon$ = 8500); NMR (DMSO-d$_6$) 3.09 $\delta$ (s, 3), 7.0 $\delta$ (b, 4).

Anal. Calcd. for C$_6$H$_7$ON$_5$: C, 43.63; H, 4.20; N, 42.41
Found: C, 44.02; H, 4.32; N, 42.76.

Part B - Larger Scale

A slurry of 21.0 g of 1-amino-2-(aminomethoxymethyleneamino)maleonitrile in 350 ml of water containing 15 drops of sulfuric acid was heated to 90°C over 25 minutes. The resulting mixture was cooled and the precipitate collected to give 19.5 g (93%) of 2-methoxy-4,5-diamino-6-cyanopyrimidine as dark crystals.

Part C - Base Catalyzed

A solution of 19.0 g of 1-amino-2-(aminomethoxymethyleneamino)maleonitrile, 4.5 ml of triethylamine and 400 ml of acetonitrile was stirred for 7 days at room temperature. Collection of the resulting precipitate gave 11.6 g (61%) of 2-methoxy-4,5-diamino-6-cyanopyrimidine as a yellow-green powder.

EXAMPLE 8

2-Ethoxy-4,5-diamino-6-cyanopyrimidine

Part A

A slurry of 7.7 g of 1-amino-2-(aminoethoxymethyleneamino)maleonitrile in 250 ml of water containing 8 drops of sulfuric acid was heated to reflux and held there for 5 minutes. The resulting mixture was cooled and filtered to give 6.0 g (78%) of 2-ethoxy-4,5-diamino-6-cyanopyrimidine as gold needles. Recrystallization from ethyl acetate gave yellow crystals, mp 175°–178°C (dec.). The same product from a similar preparation gave the following analyses: IR (nujol) 2.85, 2.90, 3.03, 3.20, 4.50, 5.95, 6.10, 6.20 and 6.55 $\mu$; UV (CH$_3$CN) 225 nm ($\epsilon$ = 8800), 306 nm ($\epsilon$ = 12,400), 379 nm ($\epsilon$ = 9200); NMR (DMSO-d$_6$) 128 $\delta$ (t, J = 7, 3), 4.32 $\delta$ (q, J = 7, 2), 7.0 $\delta$ (b, 4); Mass Spec. 179 (M$^+$), 134 (M$^+$—OEt).

Anal. Calcd for C₇H₉ON₅: C, 46.92; H, 5.06; N, 39.09
Found: C, 47.00; H, 5.14; N, 38.91.

Part B - Base Catalyzed

A solution of 3.0 g of 1-amino-2-(aminoethoxymethyleneamino)maleonitrile and 0.1 g of sodium methoxide in 75 ml of dioxane was refluxed for 3 hours, treated with activated carbon, filtered and stripped to give 1.29 g (43%) of 2-ethoxy-4,5-diamino-6-cyanopyrimidine as yellow crystals.

Cyanoformimidate starting materials of Formula I for use in this invention are prepared from cyanogen and the corresponding alcohol in the presence of potassium cyanide by the procedure of Example 1, Part A. When the cyanoformimidates of Formula I in which R is —CH₂—CH=CH₂, —CH₂—C ≡ CH, —CH₂—◁ and —CH₂—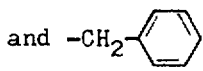

—CH₂—O—CH₂—CH₃, —CH₂—CH₂—O—CH₂—CH₃, —CH(CH₃)₂, —CH₂—CH₂—CHCl—CH₃, —CH₂—CH₂Cl, —CH₂—CH₂F, or —CH(CH₃)—CH₂NO₂ are substituted for ethyl cyanoformimidate in the procedure of Example 2, the respective substituted maleonitriles shown in the table which follows are obtained. These in turn are cyclized by the procedure of Example 8, Part A, to yield the respective 2-alkoxy-4,5-diamino-6-cyanopyrimidines shown in the Table:

TABLE

| Item | Product of Formula II | Product of Formula III |
|------|----------------------|------------------------|
| 1 | 1-Amino-2-(aminoallyloxymethyleneamino)maleonitrile | 2-Allyloxy-4,5-diamino-6-cyanopyrimidine |
| 2 | 1-Amino-2-[amino-(2-propynyloxy)methyleneamino]-maleonitrile | 2-(2-propynyloxy)-4,5-diamino-6-cyanopyrimidine |
| 3 | 1-Amino-2-[amino(cyclopropylmethoxy)methyleneamino]-maleonitrile | 2-Cyclopropylmethoxy-4,5-diamino-6-cyanopyrimidine |
| 4 | 1-Amino-2-(aminobenzyloxymethyleneamino)maleonitrile | 2-Benzyloxy-4,5-diamino-6-cyanopyrimidine |
| 5 | 1-Amino-2-[amino(ethoxymethoxy)-methyleneamino]-maleonitrile | 2-Ethoxymethoxy-4,5-diamino-6-cyanopyrimidine |
| 6 | 1-Amino-2-[amino(β-ethoxyethoxy)methyleneamino]-maleonitrile | 2-(β-Ethoxyethoxy)-4,5-diamino-6-cyanopyrimidine |
| 7 | 1-Amino-2-(aminoisopropyloxymethyleneamino)maleonitrile | 2-Isopropyloxy-4,5-diamino-6-cyanopyrimidene |
| 8 | 1-Amino-2-[amino(3-chlorobutoxy)methyleneamino]-maleonitrile | 2-(3-Chlorobutoxy)-4,5-diamino-6-cyanopyrimidine |
| 9 | 1-Amino-2-[amino(2-chloroethoxy)methyleneamino]-maleonitrile | 2-(2-Chloroethoxy)-4,5-diamino-6-cyanopyrimidine |
| 10 | 1-Amino-2-[amino(2-fluoroethoxy)methyleneamino]-maleonitrile | 2-(2-Fluoroethoxy)-4,5-diamino-6-cyanopyrimidine |
| 11 | 1-Amino-2-[amino(2-Nitropropoxy)methyleneamino]-maleonitrile | 2-(2-Nitropropoxy)-4,5-diamino-6-cyanopyrimidine |

When the cyanoformimidates of Formula I in which R is —CH₂—CF₂—CF₃, —CH(CF₃)₂, —CH₂C(NO₂)₂—CH₃, —CH₂—(CF₂)₆—H or —CH₂—CHCl₂ are substituted for 2,2,2-trifluoroethyl cyanoformimidate in the procedure of Example 4, Part B, the product in each case is 1-amino-2-(aminocyanomethyleneamino)-maleonitrile, which is cyclized to 2,6-dicyano-4,5-diaminopyrimidine by the procedure of Example 6.

EXAMPLE A

As noted above, the products of Formula III are useful curing agents for epoxy resins, as shown by the following:

Part A

A slurry of 0.15 g of 2,6-dicyano-4,5-diaminopyrimidine in 3.0 g of a partly polymerized diglycidyl ether of 2,2-bis(4-hydroxyphenyl)propane (Epon-828 from the Shell Chemical Company) was heated at 150°C. After 0.5 hour the resulting solution began to thicken and had darkened in color. After 1 hour the material was rubbery in texture and after 1.5 hours at 150°C the product was cured to a glass hard polymer.

Part B

A control of Epon-828 without any pyrimidine remained a clear, uncured liquid after 16 hours at 150°C.

Part C

A slurry of 0.15 g of 2-methoxy-4,5-diamino-6-cyanopyrimidine in 3.0 g of Epon-828 was heated as above. Within 2.5 hours at 150°C the product was cured to a glass hard polymer.

The embodiments of the invention in which an exclusive property or privilege is claimed are defined as follows:

1. A compound of the formula

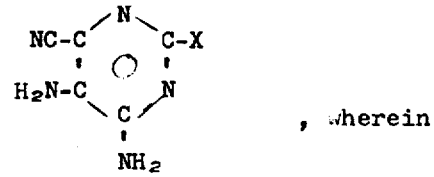

, wherein

X is CN or $R^1-\overset{\overset{\displaystyle O}{\|}}{C}-R^2$, $R^1$ and $R^2$, alike or different, being H or alkyl, alkoxy, alkenyl, alkynyl or alkoxyalkyl of up to 7 carbons, unsubstituted or substituted with up to 14 halogen and/or nitro, or phenyl, unsubstituted or substituted with up to 5 halogen and/or nitro, with the proviso that any α-carbon in $R^1$ or $R^2$ carries no more than one fluoro, chloro or nitro substituent.

2. The compound of claim 1, 2,6-dicyano-4,5-diaminopyrimidine.

3. The compound of claim 1, 2-methoxy-4,5-diamino-6-cyanopyrimidine.

4. The compound of claim 1, 2-ethoxy-4,5-diamino-6-cyanopyrimidine.

* * * * *